US012636585B2

(12) United States Patent
Yao

(10) Patent No.: US 12,636,585 B2
(45) Date of Patent: \*May 26, 2026

(54) GAMIFIED ANNOTATIONS

(71) Applicant: Sony Interactive Entertainment LLC, San Mateo, CA (US)

(72) Inventor: Chen Yao, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/315,053

(22) Filed: May 10, 2023

(65) Prior Publication Data

US 2024/0375018 A1 Nov. 14, 2024

(51) Int. Cl.
| *A63F 13/86* | (2014.01) |
| *G06F 40/40* | (2020.01) |
| *G06Q 30/0207* | (2023.01) |

(52) U.S. Cl.
CPC .............. *A63F 13/86* (2014.09); *G06F 40/40* (2020.01); *G06Q 30/0209* (2013.01)

(58) Field of Classification Search
None
See application file for complete search history.

(56) References Cited

U.S. PATENT DOCUMENTS

| 2016/0136521 A1 | 5/2016 | Doorgeest | |
| 2019/0034950 A1* | 1/2019 | Roux | G06Q 30/0282 |
| 2020/0035019 A1* | 1/2020 | Cappello | G06T 7/536 |
| 2020/0186897 A1* | 6/2020 | Dareddy | G06F 18/2155 |
| 2020/0298125 A1 | 9/2020 | Stroud | |
| 2021/0201148 A1* | 7/2021 | Li | G06N 7/01 |
| 2021/0224319 A1* | 7/2021 | Ingel | G06N 3/0455 |
| 2021/0299561 A1* | 9/2021 | Sarria, Jr. | A63F 13/79 |
| 2021/0394073 A1 | 12/2021 | Osman et al. | |
| 2022/0226734 A1 | 7/2022 | Pedersen et al. | |

OTHER PUBLICATIONS

"International Search Report and Written Opinion", dated Aug. 26, 2024, from the counterpart PCT application PCT/US24/028132.

* cited by examiner

*Primary Examiner* — Jason T Yen
(74) *Attorney, Agent, or Firm* — Fish & Richardson P.C.

(57) ABSTRACT

Non-players can vote and comment on uploaded video clips or livestreams of video games played by video game players. The video game players that upload the clips or do the livestreaming and that then receive the most votes can be awarded digital awards. The non-players providing the best comments can also be awarded digital awards. This incentivizes these behaviors, providing ample training data in the process so that the votes and comments can be used to train a model to make inferences related to video game video. For instance, the model may be trained to provide auto-generated comments in real time as a second video game is played, where the comments are in video game domain-specific language.

19 Claims, 8 Drawing Sheets

200~

*210*

Upload/Enter Last 30 Seconds/Last Sequence For Today's E-Sports Competition ~*230*

→ Get More Star Points! ~*240*

*250*~Tags: |            |~*260*   *220*

Game 1234 : Clip 2 From Video ~*310*
Game XYZ                              ~*300*

~*320*

What Do You Think Of This Drifting ~*330*
Video?
| Driving |~*340*

Vote :  |1|2|3|4|5|~*350*

Comment: |              |~*360*
         | Emojis |~*370*

Others' Comments: Wow!  |Like|

*380* ⟋ Smooth Move!  |Like|

⊗  |Like|~*390*

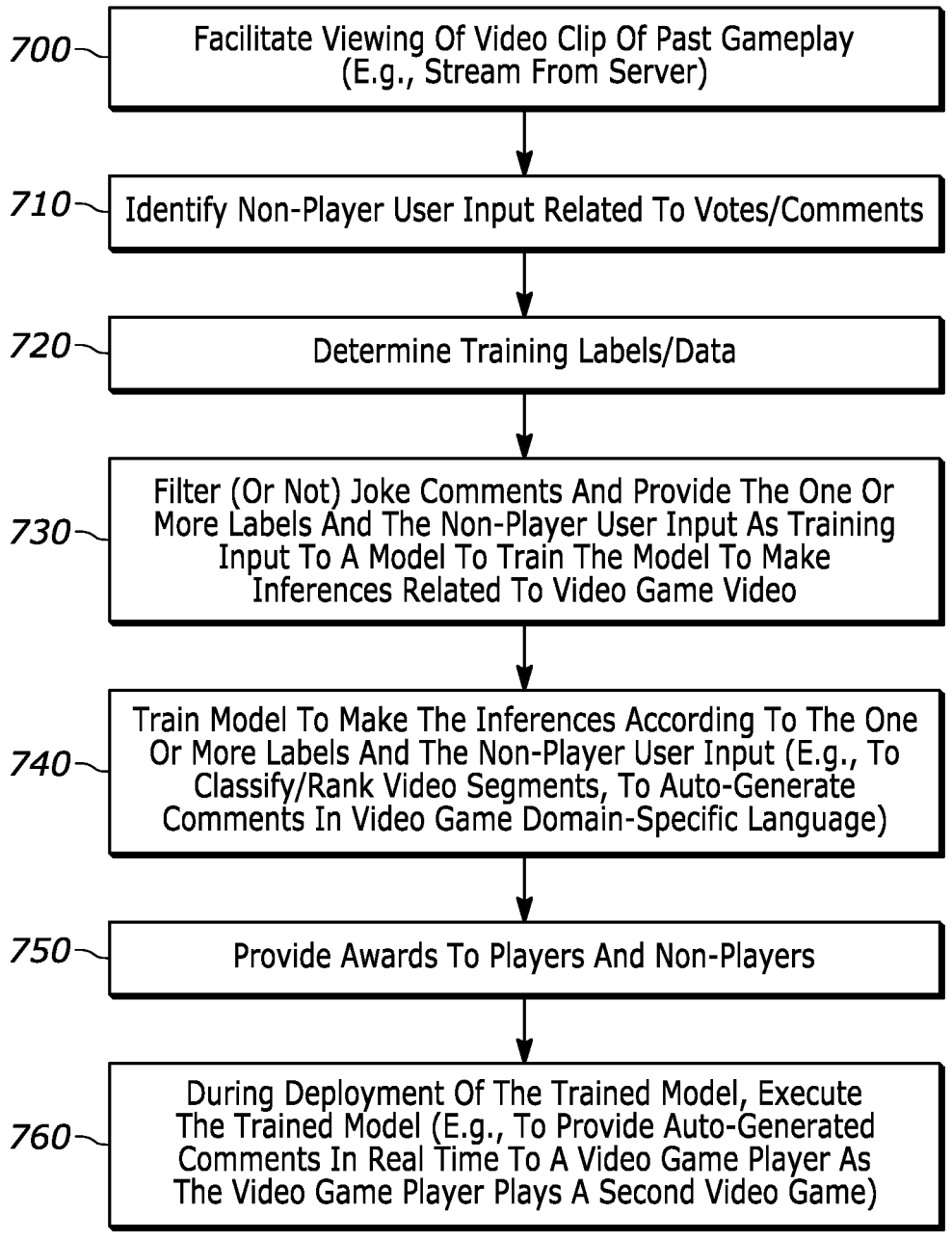

700 — Facilitate Viewing Of Video Clip Of Past Gameplay (E.g., Stream From Server)

710 — Identify Non-Player User Input Related To Votes/Comments

720 — Determine Training Labels/Data

730 — Filter (Or Not) Joke Comments And Provide The One Or More Labels And The Non-Player User Input As Training Input To A Model To Train The Model To Make Inferences Related To Video Game Video 740 — Train Model To Make The Inferences According To The One Or More Labels And The Non-Player User Input (E.g., To Classify/Rank Video Segments, To Auto-Generate Comments In Video Game Domain-Specific Language)

750 — Provide Awards To Players And Non-Players

760 — During Deployment Of The Trained Model, Execute The Trained Model (E.g., To Provide Auto-Generated Comments In Real Time To A Video Game Player As The Video Game Player Plays A Second Video Game)

FIG. 7

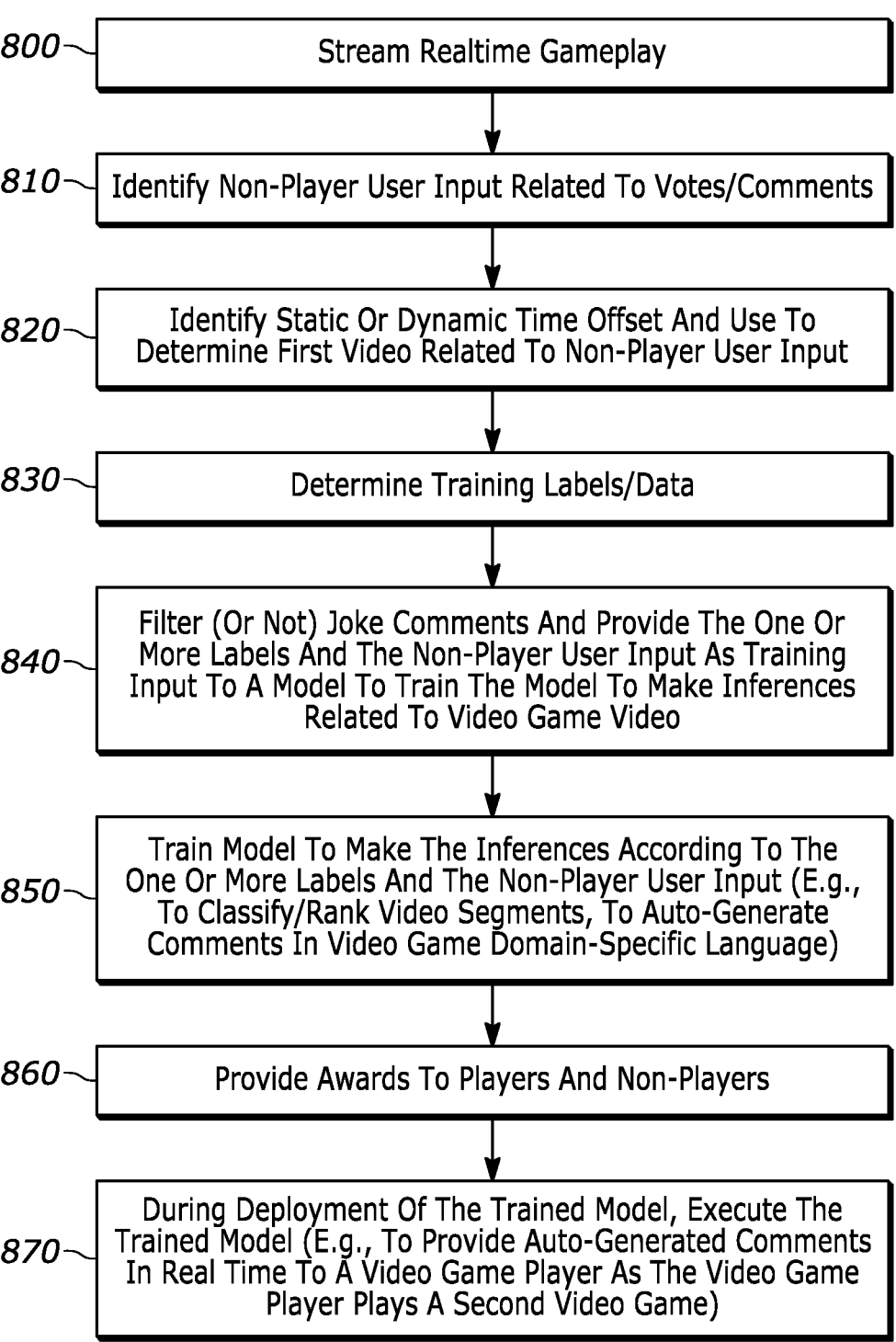

800 — Stream Realtime Gameplay

810 — Identify Non-Player User Input Related To Votes/Comments

820 — Identify Static Or Dynamic Time Offset And Use To Determine First Video Related To Non-Player User Input 830 — Determine Training Labels/Data 840 — Filter (Or Not) Joke Comments And Provide The One Or More Labels And The Non-Player User Input As Training Input To A Model To Train The Model To Make Inferences Related To Video Game Video 850 — Train Model To Make The Inferences According To The One Or More Labels And The Non-Player User Input (E.g., To Classify/Rank Video Segments, To Auto-Generate Comments In Video Game Domain-Specific Language)

860 — Provide Awards To Players And Non-Players

870 — During Deployment Of The Trained Model, Execute The Trained Model (E.g., To Provide Auto-Generated Comments In Real Time To A Video Game Player As The Video Game Player Plays A Second Video Game)

FIG. 8

GAMIFIED ANNOTATIONS

FIELD

The disclosure below relates generally to gamified annotations from non-players that may then be used to train machine learning models.

BACKGROUND

As recognized herein, sufficiently robust training data for training machine learning-based artificial intelligence models does not heretofore exist for configuring the models to perform certain video game-related functions. This, in turn, means that many video game-related practical applications are left unrealized or, at the very least, are frustrated. There are currently no adequate solutions to the foregoing computer-related, technological problems.

SUMMARY

Accordingly, in one aspect an apparatus includes at least one processor programmed with instructions to facilitate viewing of a first video clip of a first video game and to identify non-player user input related to votes regarding the first video clip and/or comments regarding the first video clip. The at least one processor is also programmed with instructions to determine, based on the non-player user input, one or more labels for the first video clip. The at least one processor is further programmed with instructions to provide the one or more labels and the first video clip as training input to a model to train the model to make inferences related to video game video and to train the model to make the inferences according to the one or more labels and the first video clip.

In various examples, the non-player user input may establish the one or more labels and/or may be used to derive the one or more labels.

Additionally, if desired the at least one processor may be programmed with instructions to, during deployment of the trained model, execute the trained model to provide auto-generated comments in real time to a video game player as the video game player plays a second video game. The second video game may be the same as or different from the first video game.

In some example implementations, the at least one processor may be programmed with instructions to, based on the non-player user input, provide an award to one or more non-players that commented on the first video clip. Additionally or alternatively, the at least one processor may be programmed with instructions to, based on the non-player user input, provide an award to a video game player that played part of the first video game captured in the first video clip.

Still further, in certain examples the model may be trained to classify different video game segments into different categories. The different categories may include combat sequence, team play sequence, and sports maneuver, as examples. What's more, the model may be trained to rank different video segments of a single instance of gameplay. Additionally or alternatively, the model may be a video game domain-specific language generator model, where the language generator model may be trained to auto-generate comments on future gameplay using video game domain-specific language.

Still further, in some implementations the at least one processor may be programmed with instructions to filter comments describing gameplay from comments joking about gameplay to train the model based on the comments describing gameplay but not the comments joking about gameplay, with the model thus being trained to make inferences related to describing gameplay. In other instances, the at least one processor may be programmed with instructions to use both comments describing gameplay and comments joking about gameplay to train the model to make inferences related to gameplay based on both.

In another aspect, a method includes facilitating, via a video sharing platform, viewing of a first video clip of a first video game. The method also includes identifying non-player user input related to votes regarding the first video clip and/or comments regarding the first video clip. The method then includes determining, based on the non-player user input, training data for training a model to make inferences related to video game video. Thereafter, the method includes inputting the training data to the model to train the model to make inferences related to video game video and training the model according to the training data.

In some examples, the method may even include, based on the non-player user input, providing a digital award to one or more non-players that commented on the first video clip. Additionally or alternatively, the method may include, based on the non-player user input, providing a digital award to a video game player that played part of the first video game captured in the first video clip.

In still another aspect, a device includes at least one computer storage that is not a transitory signal and that includes instructions executable by at least one processor to access non-player user input related to votes regarding a first video clip of a first video game and/or comments regarding the first video clip of the first video game. The instructions are also executable to train, based on the non-player user input, a model to make inferences related to video game video different from the first video clip.

In certain examples, the device may even include the at least one processor.

The details of the present application, both as to its structure and operation, can be best understood in reference to the accompanying drawings, in which like reference numerals refer to like parts, and in which:

BRIEF DESCRIPTION OF THE DRAWINGS

FIG. 7 shows example logic in example flowchart format that may be executed by one or more devices to process a video clip uploaded after the fact to train a model using the video clip consistent with present principles;

FIG. 8 shows example logic in example flowchart format that may be executed by one or more devices to process a livestream to train a model using the livestream consistent with present principles;

DETAILED DESCRIPTION

Figure 1:
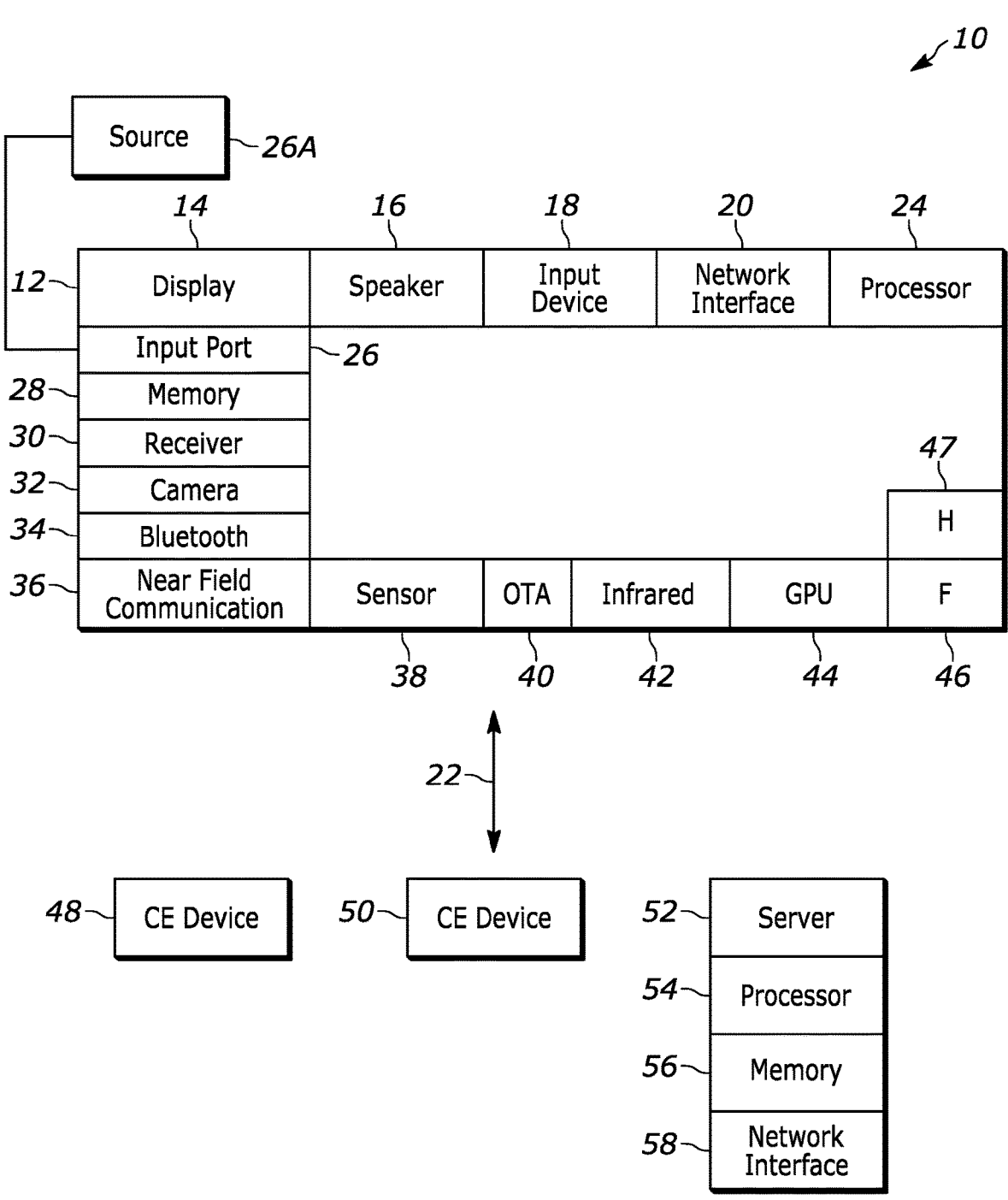
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled 5G ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby. The server 52 may also be a blade server or rack server, for example.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figures 2, 3:
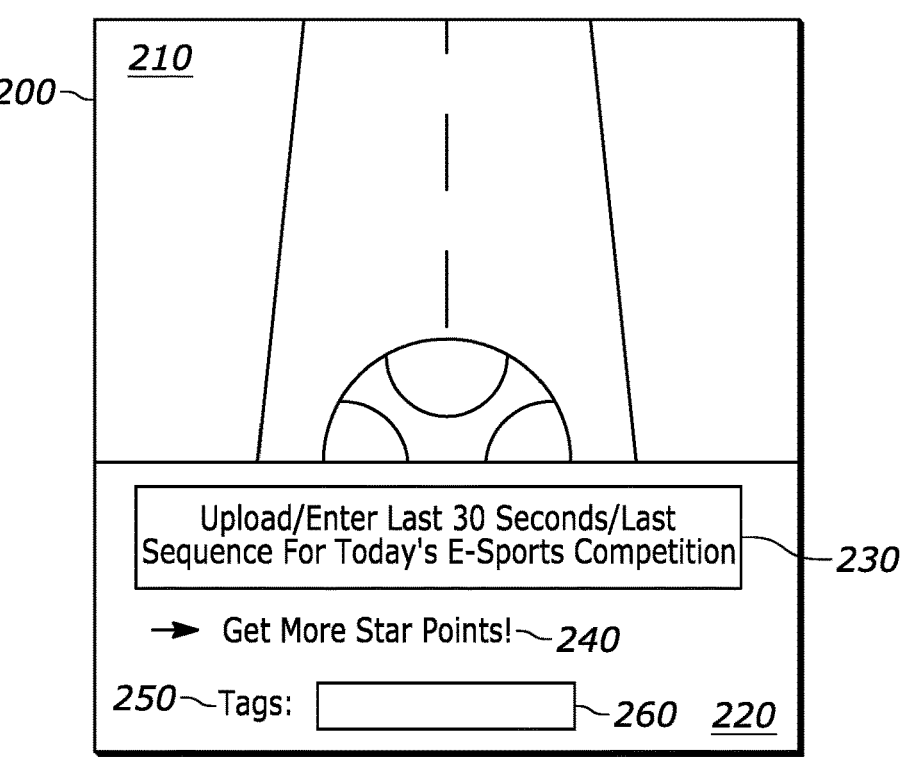
FIG. 2 shows an example graphical user interface (GUI) that may be presented while a gamer plays a video game for the gamer to upload a video on which non-players can comment and vote consistent with present principles.
FIG. 3 shows an example GUI for non-player commenting and voting on a video clip after the fact consistent with present principles.

Before getting into detail in relation to FIG. 2, note generally and consistent with present principles that crowd sourcing of annotations for video game play footage can be used to gather training data to train various types of video game-related artificial intelligence engines, with some gamifications being provided to players and non-players alike as incentives to provide and annotate videos.

As one example implementation, gamers can record and submit their game highlights so that they can participate in a competition of "your best moments of game X". The competition might be hosted by the video game console manufacturer, for example, or even co-hosted with a publisher, video sharing/streaming platform, and/or a specific franchise game producer or other content creator. Videos can therefore be opened up for the gaming community to comment and vote on each video. This might happen on the manufacturer's server and the number of submissions (e.g., votes and/or comments) per person can both be limited to a certain number and have a certain duration to create a sort of gamer tournament or competition. Therefore, in this competition players may become winners of "best highlights" for their videos by popular votes and/or by expert votes. Different categories of digital awards can even have different winners (e.g., best combat scene, best maneuver, etc.). Those categories can then become training annotations as people vote videos into different categories (e.g., peoples' votes for video clips for "best combat scene" can imply that the associated clip is a combat scene and therefore that video should be labeled "combat scene" for training a model using both the clip and the assigned label).

Additionally, the non-players themselves that are providing the comments and other non-player user input may be designated as winners of a "best comments" and/or "best caption" competition, again by popular votes and/or expert votes. This may provide further incentive for non-player viewers to provide rich and representative captions and descriptions to the videos, which can also be used as training data. The textual comments and captions may therefore be used to correlate back to "annotate" the context of those videos.

The foregoing can also be used not just for videos uploaded after the fact but also for a similar gamified event where gamers use a live streaming platform (e.g., Twitch or Discord) to livestream their gameplay in real time as they play the game themselves. Accordingly, as non-playing people watch the live streams, they can vote for certain scenes/clips for different category awards (e.g., like the above, like "best combat scene" award, etc.), and also compete themselves for "best comment/caption" by sharing how they would name or describe the scene. The annotation data can then be acquired, stored, and associated with the clips for model training.

Additionally, present principles can be used to provide platform functionalities for gamers to easily tag certain situations while they play the games themselves. For example, a voice command of "hey PlayStation, need help here, XYZ [brief description of the situation]" can be input, which will then tag/annotate the video clip X minutes or seconds before the command for the specific situation that the gamer needs help with. As another example, a unique input sequence combination using controller buttons can be used as input to "tag" the starting and/or ending of an activity for which a video should be generated and shared for commenting and voting. Additional incentives can therefore be given to the gamers that provide these videos (e.g., virtual stars as rewards).

With the foregoing in mind, reference is now made to FIG. 2. This figure shows an example graphical user interface (GUI) 200 that may be presented on a display such as a television, smartphone display, or computer monitor while a video game player plays a video game. The video game includes video game video 210 as presented as part of the GUI 200, along with video game audio (not represented in FIG. 2).

As also shown in FIG. 2, while the player plays the video game, a panel 220 may be presented. The panel 220 may include a selector 230. The selector 230 may be selectable at any point during gameplay by, for example, providing touch input to the display location at which it is presented, navigating to the selector 230 using a cursor and providing a select command with a video game controller button, or even using voice input. However selected, the selector 230 may provide a command to the video game console and/or server that is executing the video game to generate and upload a video clip of the last thirty seconds (or another most-recent threshold amount of time) of the video 210. Additionally or alternatively, the selector 230 may be selected to generate and upload a video clip of a most-recent input sequence or video game action sequence that was just performed by the player, as may be determined using principles set forth below.

In addition to or in lieu of using the selector 230, also note that voice input may be provided to the device via a microphone, with the voice input indicating something like "this is the best combat scene ever, generate and upload a video of the last [X] seconds". Here, the fact that the user as indicated the last X seconds as being a combat scene might also be used to label the video as a combat scene for training an AI-based machine learning model. As another example, a particular predetermined video game controller button combination may be selected to command the device to generate and upload a video of a last predetermined amount of time, similar to the selector 230 itself being selected.

Additionally, note here that video game video may be buffered/maintained in RAM or other storage after it is played out in real time by the client device or server so that the video clip may be generated after the fact (e.g., while the player is playing a subsequent aspect of the game) based on any of the player input types referenced above. The buffer might even be a rolling buffer than maintains a last ten minutes of gameplay or some other amount of time of gameplay, with least-recent portions then being dumped/deleted from the buffer as they expire.

Then once generated, the video clip may be uploaded to a video sharing platform such as one hosted by the client device/console's manufacturer or even an Internet-based platform hosted by a third party. In some examples, a single input or touch to select the button 230 may therefore both generate and upload the clip, with the clip being associated with the player's online profile or account. The single input/touch may also enter the video clip into an associated video competition already selected by the playing end-user user or dynamically determined based on video game type and/or available competitions for that day (or other time frame). In the present example, the button 230 indicates beforehand that selection of it will enter the clip into the current e-sports video competition that is currently ongoing.

As also shown in FIG. 2, the panel 220 may include an indication 240. The indication 240 indicates a particular incentive to the player, which in this case is being awarded "star points" for both entering the video clip into the competition regardless of outcome and also being awarded star points for winning the competition. The star points may be virtual points that have no value other than demonstrating proficiency or high use of the game, platform, or third party website itself. Or the star points may be redeemable for other virtual assets like avatars, skins, or objects (e.g., digital weapons) usable in video games. The star points might even be redeemable for virtual blockchain-based currency in certain examples.

In any case, the GUI 200 of FIG. 2 may also include a tags section 250 where the player may enter one or more tags into input box 260 (e.g., using a hard or soft keyboard or even voice input) that the associated video clip should be tagged with, with the tags being stored in metadata for the video clip and usable as labels for model training as set forth further below. In the present example, since the video game is a race car driving video game, the player might tag the video clip "drifting" since the clip shows a drifting maneuver, or "racing" or just "driving" more generally. More than one tag may be entered if desired.

Turning now to FIG. 3, another example GUI 300 is shown. The GUI 300 may be presented via a console manufacturer video sharing platform, third party video sharing platform, or through other means. The GUI 300 may be presented to non-players observing the game from FIG. 2 so that the driving clip generated as described above may be voted on and commented on as part of a competition for best overall video clip, best e-sports clip, best driving clip, etc. As shown, the GUI 300 includes a player-designated or auto-generated title 310 for the clip, which in the present example is a title identifying the gamer themselves by name as well as the clip itself and the video game name depicted in the clip. A window 320 is also presented and may be selected to initiate playback of the clip in the window 320 for viewing by a given non-player viewing the GUI 300 on his/her respective client device.

A prompt 330 is also presented as part of the GUI 300. The prompt 330 asks the non-player what the non-player thinks of the drifting video clip. The tag entered by the player themselves via the input box 260 of FIG. 2 may be used to designate the clip as a "drifting" clip in the prompt 330, and/or the clip may be independently classified as such by a machine-learning based classifier model consistent with present principles.

In any case, further note that a selector 340 may be presented. The selector 340 may be selectable to cause a drop-down list to be presented from which a particular type of vote may be selected. In the present example, "best driving video" has been selected as the type of vote that the non-player is going to provide. Other examples might include best overall video, best e-sports video, best driving maneuver, etc. The non-player selections via the drop-down list may even be used as labels for training consistent with the disclosure below to help classify videos based on the non-player video classifications input via the selector/list 340.

The non-player end user may then enter his/her vote. In the present example, the vote may be on a scale from one to five, with one being a least satisfactory vote and five being a best maximum vote. Respective selectors 350 may therefore be selected to vote on the video clip on the scale from one to five. Other scales may also be used, or in some examples a simple up/down vote, like/dislike vote, or single "like" vote might be used. The votes input by various non-players may then be used to rank the video clip for the competition and may also be used as training input to a model to train the model on what is considered a good video game move (driving move in this example) and what is considered a suboptimal video game move based on positive or negative votes.

As also shown in FIG. 3, in some examples the GUI 300 may include a comment box 360 at which the non-player may enter one or more comments pertaining to the video. The non-player may therefore use a hard or soft keyboard to enter the comment to box 360, provide voice input to enter the comment to box 360, or might even select emoji selector 370 to select one or more emojis from an ensuing emoji list that is presented for the emoji(s) to be included as comments. The comments may then be associated with the video for comment viewing by others as well as used as training input to train a model (e.g., language generator) on what comments would be appropriate or relevant for the particular video game actions shown in the video so that the model may be used later during a subsequent deployment to auto-generate comments to a video game player for a different video game action in the same or even a different video game. In some specific examples, the comments may therefore be used to train the language generator to auto-generate video game domain-specific language in the form of auto-generated comments on future gameplay and, in some examples, to filter relevant from irrelevant/joke comments as described below.

As further incentive to the non-player, the comment(s) entered into box 360 for the video clip may themselves be voted on. Non-players may therefore be incentivized to provide interesting and/or accurate comments about the video clip to win a voting contest for the comments themselves, which might in turn result in a digital award of star points or other types of digital awards. This feature is also shown in FIG. 3, where past comments 380 entered by other non-players are presented beneath the box 360. As shown, these comments may include text-based comments as well as graphic-based comments (emojis in the present example). Respective "like" buttons 390 may also be presented next to each comment for other non-players to "like" and hence favorably vote on other non-players' comments. Those separate votes may then also be used to determine the winner of a separate comment competition where "likes" are tallied and the non-player that provided the comment receiving the most likes may receive a digital award. This provides even further incentive for non-players to provide comments which can then be used on the back end for training a model consistent with present principles.

Figure 4:
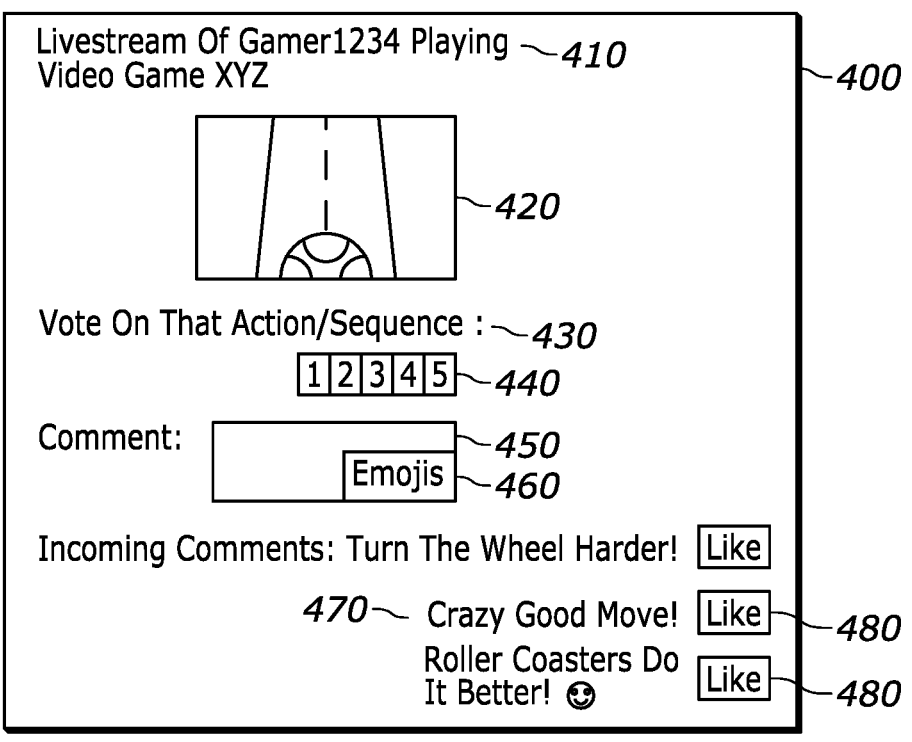
FIG. 4 shows an example GUI for non-player commenting and voting on a video during a livestream consistent with present principles.

Turning now to FIG. 4, another example GUI 400 is shown. In this example, rather than voting on a video game clip after the fact after the video game or at least a certain level or part thereof has been played by the player and the associated clip uploaded, here non-players may vote and comment in real time as the player streams his/her video of gameplay to others while the player plays the game in real time themselves. As with FIG. 3, the GUI 400 may be presented via a console manufacturer video sharing platform, third party video sharing platform, or through other means, and may be presented to non-players of the game via their respective client device displays so that certain aspects of the player's driving game livestream may be voted on and commented on in real time as part of a competition for best overall video, best e-sports video, best driving video, etc.

As shown, the GUI 400 includes a player-designated or auto-generated title 410 for the live video, which may in the present example is a title identifying the gamer themselves, the video game depicted in the live video, and an identifier that the live video is in fact a livestream. A window 420 is also presented and may be selected to begin real time playout of the livestreamed video in the window 420 for viewing by the non-player viewing the GUI 400 on his/her respective client device.

As with FIG. 3, for FIG. 4 a prompt 430 may be presented as part of the GUI 400. The prompt 430 asks the non-player what the non-player thinks of the live video. The tag entered by the player themselves via the input box 260 of FIG. 2 may be used to designate the live video as a "drifting" video in the prompt 430, and/or the live video may be independently classified as such by a machine-learning based classifier model consistent with present principles.

Still in reference to FIG. 4, further note that a selector similar to the selector 340 may also be presented on the GUI 400 for selecting a particular type of vote a non-player will subsequently input, though it is not shown in FIG. 4 itself. The non-player user may then enter his/her vote using the selectors 440, which may be similar to the selectors 350 from above, though again note that different scales and even binary "yes/no" or "like/dislike" voting selectors may also be used. Regardless, as with FIG. 3, the votes input by various non-players to the GUI 400 may then be used to rank the live video for the competition and may also be used as training input to a model to train the model on what is considered a good video game move (a good driving move in this example) and what is considered a suboptimal video game move based on respective positive or negative votes.

A comment box 450 that may be similar to the box 360 may also be included for non-players to enter comments regarding the live video, and the non-playing user might even select the emoji selector 460 to comment using an emoji consistent with present principles. Here again the comments may then be associated with the live video for comment viewing by others as well as used as training input to train a model (e.g., language generator) on what comments would be appropriate or relevant for the particular video game actions shown in the video so that the model may be used later during a subsequent deployment to auto-generate comments to a video game player for a different video game action in the same or even a different video game.

Figure 5:
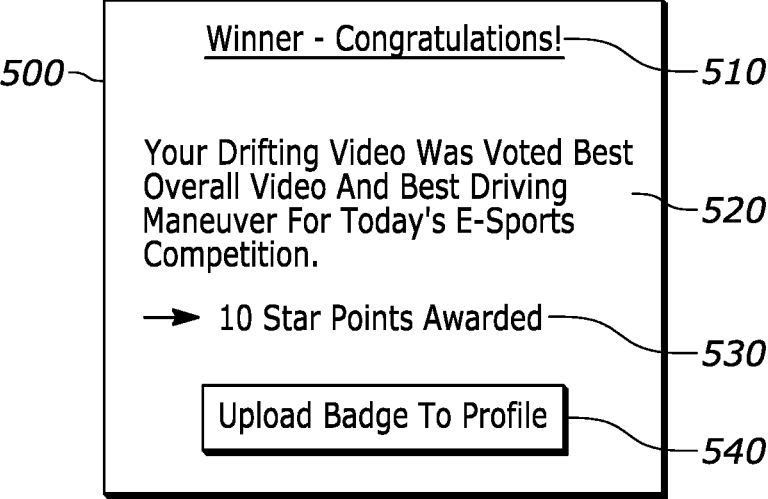
FIG. 5 shows an example GUI that may be presented to a gamer to indicate digital awards the gamer has received consistent with present principles.

As further incentive to the non-player, the comment(s) entered into box 450 for the live video may themselves be voted on, also similar to as in FIG. 3 to incentivize non-players to provide comments as set forth above. Thus, past comments 470 entered by other non-players are presented, as may respective "like" buttons 480 for other non-players to "like" and hence favorably vote on other non-players' comments. Those separate votes may again also be used to determine the winner of a separate comment competition where "likes" are tallied and the non-player that provided the comment receiving the most likes may receive a digital award. Now in reference to FIG. 5, an example GUI 500 is shown that may be presented on the display of a player's gaming device should the player win a video clip or livestream competition consistent with present principles. As shown, the GUI 500 includes a prompt 510 that the player has won a video competition as well as details 520 indicating that the player's video has been voted one or both of best overall video and best video of a particular category or sub-category. A drifting driving maneuver video for an e-sports driving video game is again being used in the present example, and here the player's video has won both best overall video as well as best driving maneuver video in particular for an e-sports video competition that took placed over a recent twenty-four hour period.

The GUI 500 may also indicate various incentives awarded to the player, which in the present example includes an indication 530 of ten star points being awarded. As further incentive to participate in more tournaments (and hence generate more training data that may be used on the back end by the console manufacturer or other party), the player may be awarded a unique profile badge indicating that he/she won that particular video competition. The badge may be displayed as part of the player's gaming profile page so that when others look at the page, they see the badge awarded to the player. Accordingly, selector 540 may be selected by the player to command the device/server to upload and associate the newly-awarded badge to the player's gaming profile.

Figure 6:
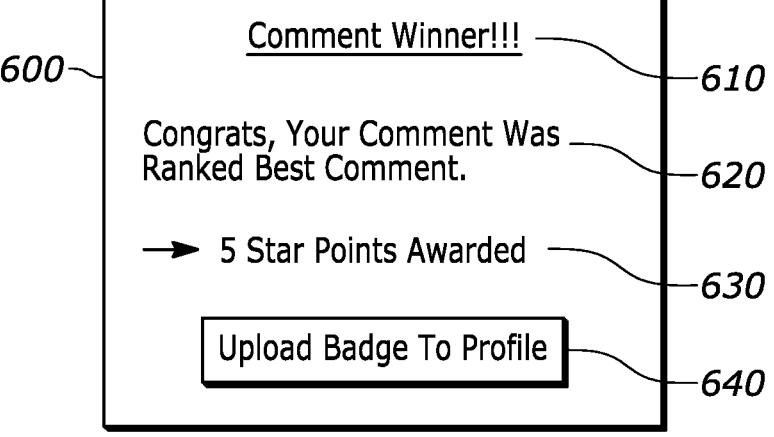
FIG. 6 shows an example GUI that may be presented to a non-player to indicate digital awards that the non-player has received consistent with present principles.

Likewise, FIG. 6 shows an example GUI 600 that may be presented on the display of a non-player's client device should the non-player win a comment competition consistent with present principles. As shown, the GUI 600 includes a prompt 610 that the non-player has won a comment competition as well as details 620 indicating that the non-player's comment has been voted one or both of best overall comment and best comment of a particular category or sub-category (e.g., funniest comment, most insightful comment, most critical comment, etc.). Again the competition may for the same particular e-sports video competition as above that took placed over a recent twenty-four hour period.

The GUI 600 may also indicate various incentives awarded to the player, which in the present example includes an indication 630 of five star points being awarded. As further incentive to comment in more tournaments (and hence generate more training data that may be used on the back end by the console manufacturer or other party), the non-player may be awarded a unique profile badge indicating that he/she won that particular comment competition. The badge may be displayed as part of the non-players profile page (gaming or third party platform profile) so that when others look at the page, they see the badge awarded to the non-player. Accordingly, selector 640 may be selected by the non-player to command the device/server to upload and associate the newly-awarded badge to the non-player's profile.

Continuing the detailed description in reference to FIG. 7, example logic is shown that may be executed by one or more devices alone or in any appropriate combination consistent with present principles. For example, various steps in the logic of FIG. 7 may be executed by a gaming computer, smartphone, gaming console, and/or remotely located gaming/video hosting platform server in any appropriate combination. Also note here that the logic of FIG. 7 pertains to an example like that of FIG. 3 where a video clip is uploaded for voting after gameplay ends or at least after the fact even if the user continues playing other aspects of the game (e.g., rather than streaming a livestream in real time).

Beginning at block 700, the device may facilitate viewing of the video clip of past gameplay. This may include generating and uploading the clip to a host server. Depending on implementation, this may also include the host server streaming the video clip to non-player client devices. From block 700 the logic may proceed to block 710. At block 710 the device may identify non-player user input related to votes and/or comments on the video clip, including input that might be provided to the input elements of the example GUI 300 of FIG. 3 to vote and/or comment on the video clip as described above.

From block 710 the logic may then proceed to block 720. At block 720 the device may determine training data as well as labels for the training data based on the non-player user input so that the training labels/data may be used to train a model to make inferences related to video game video. In some examples, non-player user input such as binary like/ dislike votes, votes on a scale, and one or more words/emojis from comments may be used to establish the labels themselves so the model is trained to output inferences similar to the training votes/comments themselves. In terms of comments in particular, in some examples keyword recognition as well as natural language processing (NLP) techniques may be used to prune and distill comments to use as labels while filtering out other aspects of the comments that include insignificant words (e.g., "the" and "and").

Additionally or alternatively, the non-player user input may be used to derive the one or more labels. For example, a spellcheck editor maybe used to correct incorrect grammar and spellings from comments. Additionally, NLP, and even topic segmentation and natural language understanding (NLU) in particular, may be used to identify topics and subjects of the comments to then use the derived topics and subjects of the comments themselves as the labels. Emotions inferred from the comments as well as positive/negative tones of the comments may also be derived using NLU to then use the determined emotions/tones as labels for training.

From block 720 the logic may then proceed to block 730 where the device may, if desired, filter comments describing gameplay from comments joking about gameplay to train the model based on the labels for comments describing gameplay but not the labels for comments joking about gameplay so that the model may be more tailored to making inferences related to describing gameplay per the labels. This may be desirable to accurately fine-tune the model to make accurate description inferences without too much "noise" being incorporated into the training data that might otherwise lead to a model that as not as optimally trained for such purposes. The filtering itself may again be executed using NLP, including topic segmentation and NLU, to discriminate descriptive comments from joking/nonserious comments to thus eliminate comments that are joking/ nonserious (as well as their associated labels) from being included in the training data.

However, present principles also recognize that in some instances, optimally training the model might include training the model to make its own inferences joking about gameplay, such as to auto-generate funny (or even sarcastic or critical) comments about gameplay. This may be done in addition to or in lieu of training on and producing comments that are descriptive of gameplay but that are not necessarily funny/critical. Therefore, in some examples the device might use both labels for comments describing gameplay and labels for comments joking about gameplay to train the model to make inferences related to gameplay.

Whether filtering is executed or not, at block 730 the device may then provide the (filtered or unfiltered) labels for a given video to the model along with the respective video itself to, at block 740, train the model according to the labels/non-player user input to make inferences related to other video game video using the labels and video provided as training input. The model maybe trained using various unsupervised learning techniques (and/or other training techniques described above) owing to the labels being auto-generated and applied to respective videos for training consistent with present principles.

As an example of how the model may be trained to make inferences related to video game video, a base model may be adopted that is a generative model such as pretrained large language models with open-source permissible licenses (e.g., based on GPT-J, GPT-NeoX, StableLM, etc.), and then that model may be trained using the training data to tailor the model to inferences related to video game video in particular, such as to provide auto-generated comments in real time to a video game player as the video game player plays the same or a different video game as the one from the training videos. Thus, in at least some examples, transformer models and/or recurrent neural networks may be used.

In some specific examples, the model may therefore be particularly trained to establish a video game domain-specific language generator model that is trained to auto-generate comments on future gameplay using video game domain-specific language. Thus, while certain comments might not be appropriate or germane to other types of video, certain comments provided by non-players watching video gameplay may be used to train the model to auto-generate comments germane to video gameplay. The model might even be trained to auto-generate comments in modern parlance/current language trends such as those used by relatively younger gamers and observers. Additionally or alternatively, different non-player votes and comments from non-players of different demographic groups including different sex and age groups may be used as training data to train the model to auto-generate comments in language germane to and typically used by individuals of the same sex or age range so that sex and age-appropriate auto-generated comments may be output to an individual of a known sex/age during model deployment.

What's more, in some specific examples the language generator may be trained to take comments made by one sex or individual of a certain age range and translate them into different parlance more likely to be understood by an individual of a different sex or age range. For example, a sixty year old game player might not be apprised of the latest slang used by teenage gamers, and so when the older gamer is playing against a teenage gamer and one provides a comment to the other through the video game, the translator may be used to translate the comment into parlance more understandable by the receiving gamer based on the original comment provided by the other gamer.

Still in reference to block 740, further note that the model may be trained for other types of inferences as well, such as training a video classifier model to classify different video clips/segments into different categories such as combat sequence, team play sequence, e-sports maneuver, first person shooter avatar maneuver, high-difficulty input sequence, adept puzzle solving, socially positive/cool thing accomplished, and sub-categories thereof. As such, various video classification convolutional neural networks (NNs) and recurrent NNs may be adopted and trained. In some examples, identifying a sequence may then be used to identify a start and end of a given video clip, which may then be used for clipping and processing the video clip based on the clip capturing the identified sequence of game events.

As another example, the model may be trained to rank different video segments of a single instance of gameplay, whether that gameplay involves a single game event or a sequence of game events (e.g., over multiple levels or stages of the game). As such, various deep ranking models may be used, such as vector space models.

After accessing the training data (e.g., generating and/or locating in storage) and training the model itself at block 740, the logic of FIG. 7 may then continue to block 750. At block 750 the device may provide awards to one or more non-players that commented on a given video clip that was used for training as described above. Also at block 750, the device may provide awards to video game players that played part of the respective video game captured in the respective video clip. The awards may be based on predetermined criteria, such as most "likes" or highest average vote, amongst all individuals or individuals deemed "experts" for example.

The logic may then proceed to block 760 where the device may, during deployment of the trained model, execute the trained model to operate in conformance with its trained purpose(s) as described above (e.g., provide auto-generated comments in real time to a video game player as the video game player plays a second video game that is the same as or different from the one on which the model was trained).

Now in reference to FIG. 8, additional example logic is shown that may be executed by one or more devices alone or in any appropriate combination consistent with present principles. For example, various steps in the logic of FIG. 8 may be executed by a gaming computer, smartphone, gaming console, and/or remotely located gaming/video hosting platform server in any appropriate combination. In contrast to FIG. 7, the logic of FIG. 8 pertains to an example like that of FIG. 4 where a video game livestream is being hosted for voting while the player plays the game in real time. Note that many of the logic steps of FIG. 8 may be similar to respective logics steps from FIG. 7 as described above, save differences discussed below.

Beginning at block 800, the device may facilitate viewing of video of current gameplay as streamed from a gaming user's client device in real time as the gamer plays the game. From block 800 the logic may proceed to block 810. At block 810 the device may identify non-player user input related to votes and/or comments on the live video, including input that might be provided to the input elements of the example GUI 400 of FIG. 4 to vote and/or comment on the live video as described above.

From block 810 the logic may then proceed to block 820. At block 820 the device may identify a static or dynamic time offset and use the offset to determine that a particular segment of the live video is related to the received/identified non-player user input. This segment will be referred to below as first video. The time offset may therefore be used to determine that the non-player user input pertains to the first video in particular and to eventually provide training labels and the first video itself a training input to a model consistent with present principles.

Accordingly, in some examples the time offset may be a predetermined offset accessible via storage accessible to the at least one processor. The offset may be predetermined in that the console manufacturer or another party may empirically determine an appropriate time offset from observing how long of a delay is typical from when a particular temporal segment of a livestream is played out to when comments are received at a later time regarding that segment, with it being recognized that comments would not be provided instantaneously with playout of the livestream segment itself since it would naturally take the non-players at least a little time (and hence a little delay) to vote or comment on the segment after viewing it.

Additionally or alternatively, if desired the time offset may be dynamically identified. For example, the time offset may be dynamically identified based on respective times at which the non-player user input is received. For example, the time offset may be identified as a particular amount of time before a beginning of a window of time during which a majority of the non-player user input is received, whenever that majority (or at least threshold amount of user input) might be received in a particular instance.

As another example, the time offset may be dynamically identified based on an output from an artificial neural network trained to make inferences about time offsets to apply, such as one that uses NLU and topic segmentation to match comments (and associated votes) to actions in the video game video that themselves are identified through action recognition. Thus, the time offset may be identified here as an amount of time dating back to a beginning of a particular temporal segment of the video that encompasses the game action(s) to which the comments are determined to pertain.

From block 820 the logic may then proceed to block 830. At block 830 the device may determine training data as well as labels for the training data based on the non-player user input so that the training labels/data may be used to train a model to make inferences related to video game video as described above.

From block 830 the logic may then proceed to block 840 where the device may, if desired, filter comments describing gameplay from comments joking about gameplay as described above. Also at block 840, the device may provide the (filtered or unfiltered) labels for a given video to the model along with the respective video itself to, at block 850, train the model according to the labels/non-player user input to make inferences related to other video game video using the labels and video provided as training input as set forth above. Thus, the model may be trained according to the processes described above per FIG. 7 and for any of the implementations/inference types described per FIG. 7 above (e.g., per block 740).

After accessing the training data (e.g., generating and/or locating in storage) and training the model itself at block 850, the logic of FIG. 8 may then continue to block 860. At block 860 the device may provide awards to one or more non-players that commented on the first video that was livestreamed and used for training as described above. Also at block 860, the device may provide awards to video game players that played part of the respective video game captured in the respective first video that was livestreamed. Again note that the awards may be based on predetermined criteria, such as most "likes" or highest average vote, whether amongst all individuals or individuals deemed "experts" for example.

The logic may then proceed to block 870 where the device may, during deployment of the trained model, execute the trained model to execute in conformance with its trained purpose(s) as described above (e.g., provide auto-generated comments in real time to a video game player as the video game player plays a second video game that is the same as or different from the one on which the model was trained).

Figure 9:
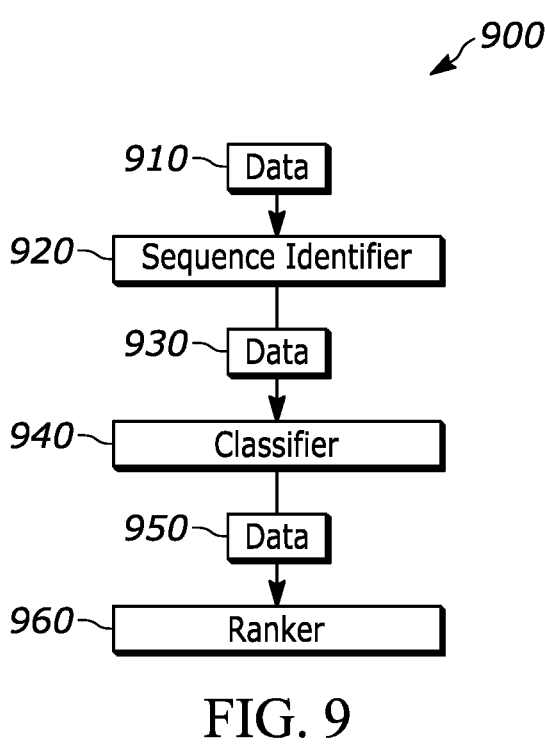
FIG. 9 shows example artificial intelligence (AI) architecture for classifying and ranking video game video consistent with present principles.

Now in reference to FIG. 9, example artificial intelligence (AI) architecture 900 that may be used consistent with present principles is shown. Here, the architecture 900 may be used during deployment of a model trained consistent with present principles to classify and rank a video clip or livestream video. Accordingly, input data 910 in the form of raw or pre-processed video may be provided as input to a sequence identifier 920, which may be established by one or more models set forth above for sequence ID (e.g., vector space model) or by a long short-term memory (LSTM) network for example.

Processed data 930 output by the sequence identifier 920 may then be provided as input to a classifier 940. The classifier 940 may then classify the sequence determined by the identifier 920 into a certain type of video, e.g., combat video, e-sports video, team play, etc. The classifier may also be established by one or more of the models set forth above for classification, such as a convolutional NN and/or recurrent NN (e.g., a LSTM network in particular) for example.

Processed data 950 output by the classifier 940 may then be provided as input to ranker 960, which may be established by one or more models set forth above for ranking and/or a top N video ranker for example. Output from the ranker 960 may then be used as set forth above.

Figure 10:
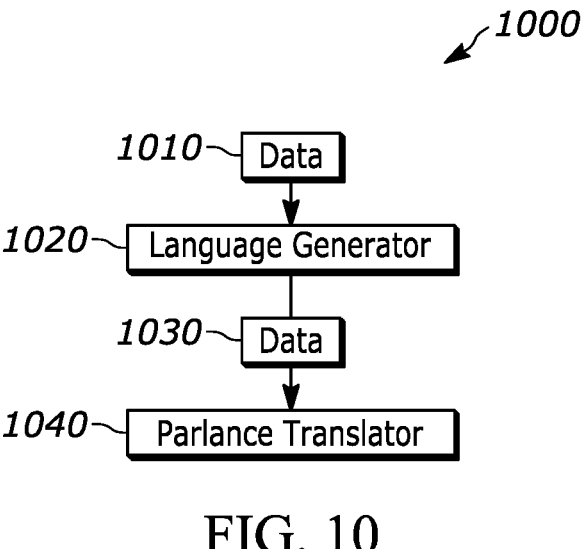
FIG. 10 shows example AI architecture for auto-generating comments and/or annotations for video game video consistent with present principles.

For example, in reference to the AI architecture 1000 of FIG. 10, the output data from the ranker 960 may be provided as input data 1010 to a language generator 1020, which may be established by one or more models as set forth above. The language generator 1020 may then generate processed data 1030 in the form of auto-generated text language and emojis about the video game action or action sequence based on various metrics, including how the video was classified and/or ranked (e.g., good move, bad move, exceptional e-sports move, skilled combat move, etc.).

Output data 1030 from the language generator 1020 may then be output to the gaming user as an auto-generated comment/annotation or, if desired, provided as input to a parlance translator 1040. The parlance translator 1040 may also be established by one or more generative models as set forth above (e.g., fine-tuned large language models) and may translate the language from one parlance to another as also set forth above. Here, output from the parlance translator 1040 may then be provided to the gaming user as an auto-generated comment/annotation.

Figure 11:
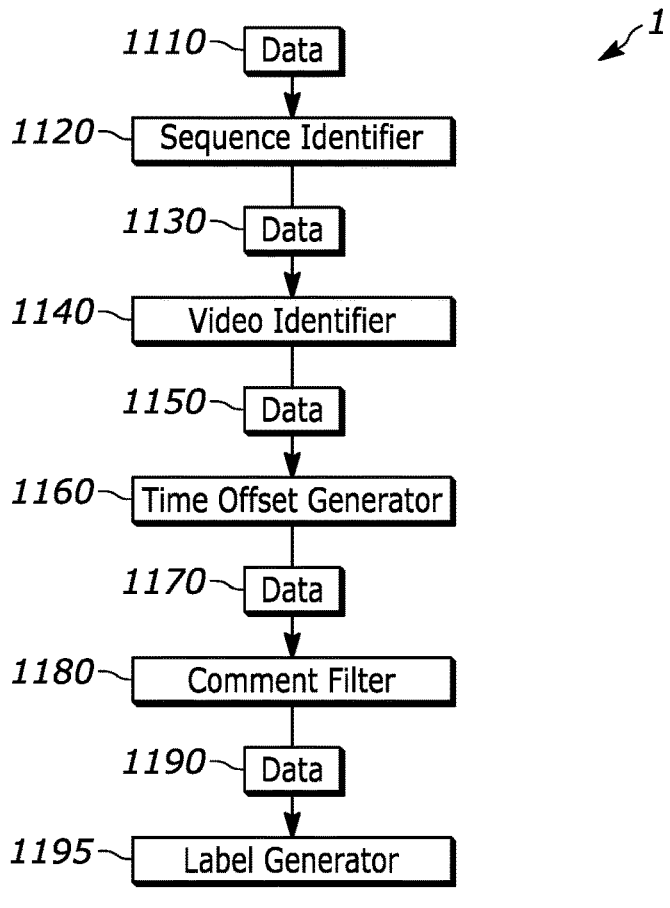
FIG. 11 shows example AI architecture for generating training data to train one or more models consistent with present principles.

Continuing the detailed description in reference to FIG. 11, example AI architecture 1100 is shown for processing certain videos/clips and non-player user input data so that the combinations can be used for training as set forth above. Accordingly, raw input data 1110 in the form of videos and non-player user input may be provided as input to a sequence identifier 1120 that may be similar to the identifier 920 in certain non-limiting examples. Processed data 1130 output by the identifier 1120, including data indicating a coherent sequence of game events, may then be provided to a video identifier 1140 as input. The identifier 1140 may identify a distinct video segment or clip as encompassing the identified sequence (e.g., a continual segment of video with a start and end time encompassing the identified sequence).

Processed data 1150 from the video identifier 1140 may then be provided as input to a time offset generator 1160. The time offset generator 1160 may then identify a time offset as described above so that various non-player user input is correctly matched to respective video that is identified/clipped. Output from the generator 1160 may then be provided as input data 1170 to a comment filter, if desired. The comment filter 1180 may be established by one or more models/techniques set forth above to filter comments for various training videos per the description above, such as to filter jokes and other non-serious comments.

Thereafter, processed data 1190 output by the filter 1180 may be provided as input data to a label generator 1195. The label generator 1195 may generate one or more labels for the respective video based on the processed data/non-player user input for the respective video according to models/techniques for label generation as set forth above.

Figure 12:
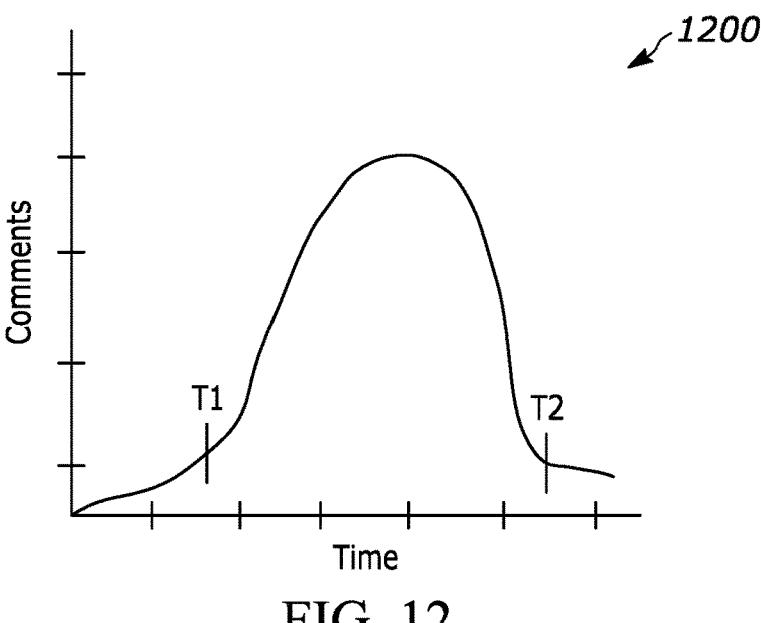
FIG. 12 shows a graph of comments on a certain video over time, where the graph may be used to identify a time offset consistent with present principles.

Now in reference to FIG. 12, an example graph 1200 is shown with comment/vote numbers being represented by the Y axis and time being represented by the X axis. This graph may be generated by a device operating consistent with present principles based on non-player user input that is received. The graph may then be used to identify a time offset as described above, such as to identify a time offset based on when a majority of comments/votes for a certain video were received. Here, the majority is identified as beginning at time T1 and ending at time T2 based on those times being the respective beginnings and ends of exponentially increasing and decreasing comments/votes.

While the particular embodiments are herein shown and described in detail, it is to be understood that the subject matter which is encompassed by the present invention is limited only by the claims.

What is claimed is:

1. An apparatus, comprising:
    at least one processor programmed with instructions to:
        facilitate viewing of a first video clip of a first video game;
        identify non-player user input related to one or more of: votes regarding the first video clip or comments regarding the first video clip;
        determine, based on the non-player user input, one or more labels for the first video clip;
        provide the one or more labels and first video clip as training input to a model to train the model to make inferences related to video game video;
        train the model to make the inferences according to the one or more labels and the first video clip; and
        filter comments describing gameplay from comments joking about gameplay to train the model based on the comments describing gameplay but not the comments joking about gameplay, the model being trained to make inferences related to describing gameplay.

2. The apparatus of claim 1, wherein the non-player user input establishes the one or more labels.

3. The apparatus of claim 1, wherein the non-player user input is used to derive the one or more labels.

4. The apparatus of claim 1, wherein the non-player user input relates at least to the votes regarding the first video clip.

5. The apparatus of claim 1, wherein the non-player user input relates at least to the comments regarding the first video clip.

6. The apparatus of claim 1, wherein the at least one processor is programmed with instructions to:
    during deployment of the trained model, execute the trained model to provide auto-generated comments in real time to a video game player as the video game player plays a second video game.

7. The apparatus of claim 6, wherein the second video game is different from the first video game.

8. The apparatus of claim 1, wherein the at least one processor is programmed with instructions to:

based on the non-player user input, provide an award to one or more non-players that commented on the first video clip.

9. The apparatus of claim 1, wherein the at least one processor is programmed with instructions to:

based on the non-player user input, provide an award to a video game player that played part of the first video game captured in the first video clip.

10. The apparatus of claim 1, wherein the model is trained to classify different video game segments into different categories.

11. The apparatus of claim 10, wherein the different categories comprise combat sequence, team play sequence, sports maneuver.

12. The apparatus of claim 1, wherein the model is trained to rank different video segments of a single instance of gameplay.

13. The apparatus of claim 1, wherein the model is a video game domain-specific language generator model trained to auto-generate comments on future gameplay using video game domain-specific language.

14. The apparatus of claim 1, wherein the at least one processor is programmed with instructions to:

use both comments describing gameplay and comments joking about gameplay to train the model to make inferences related to gameplay.

15. A method, comprising:

facilitating, via a video sharing platform, viewing of a first video clip of a first video game;

identifying non-player user input related to one or more of: votes regarding the first video clip, comments regarding the first video clip;

determining, based on the non-player user input, training data for training a model to make inferences related to video game video;

inputting the training data and the first video clip to the model to train the model to make inferences related to video game video;

training the model according to the training data; and filtering comments describing gameplay from comments joking about gameplay to train the model based on the comments describing gameplay but not the comments joking about gameplay, the model being trained to make inferences related to describing gameplay.

16. The method of claim 15, comprising:

based on the non-player user input, providing a digital award to one or more non-players that commented on the first video clip.

17. The method of claim 15, comprising:

based on the non-player user input, providing a digital award to a video game player that played part of the first video game captured in the first video clip.

18. A device, comprising:

at least one computer storage that is not a transitory signal and that comprises instructions executable by at least one processor to:

access non-player user input related to one or more of: votes regarding a first video clip of a first video game, comments regarding the first video clip of the first video game;

train, based on the non-player user input and the first video clip, a model to make inferences related to video game video different from the first video clip; and use both comments describing gameplay and comments joking about gameplay to train the model to make inferences related to gameplay.

19. The device of claim 18, comprising the at least one processor.

\* \* \* \* \*